April 30, 1963 G. W. RIECKENBERG 3,087,344

MOTION-TRANSMITTING DEVICE

Filed Nov. 23, 1959 3 Sheets-Sheet 1

INVENTOR.
GEORGE W. RIECKENBERG

BY William E. Recktenwald
Charles S. Penfold
ATTORNEY

INVENTOR.
GEORGE W. RIECKENBERG
BY William E. Recktenwald
Charles S. Penfold
ATTORNEY

MOTION-TRANSMITTING DEVICE

Filed Nov. 23, 1959

3 Sheets-Sheet 3

INVENTOR.
GEORGE W. RIECKENBERG
BY W. E. Recktenwald
C. S. Penfold
ATTORNEY

United States Patent Office 3,087,344

Patented Apr. 30, 1963

3,087,344

MOTION-TRANSMITTING DEVICE

George W. Rieckenberg, Hobart, Ind., assignor to The Anderson Company, a corporation of Indiana

Filed Nov. 23, 1959, Ser. No. 854,629
5 Claims. (Cl. 74—95)

This invention relates to motion-transmitting mechanisms and more particularly to a mechanism for varying the speed and torque transmitted to an output member from an input member.

Many different systems have been proposed and used throughout the years in transmitting motion from a motor to one or more wiper arm-and-blade subassemblies for moving said subassemblies across the surface of a windshield to be wiped. The two more widely used of these systems employs, in one case, a system of cables and pulleys and, in the other case, bell cranks and links. In the cable and pulley-type system, many disadvantages have been found to be inherent in that the cable stretches creating slap and play in the system that results in noise and malfunctioning of the subassemblies on the windshield. In the bell-crank and link-type systems precise positioning of the pivot shafts and motor shaft is necessary, as well as accurately maintained dimensions of the cranks and links in order to be assured that when assembled a dead-center condition will not result which locks the system, causing either the motor to burn out or some of the pivots to fail. There are many other disadvantages to the prior systems that made it desirable to seek to improve the transmission of forces from the motor to the pivot shafts.

Such a system was patented by John W. Anderson, U.S. Patent No. 2,901,764 issued September 1, 1959, wherein a highly desirable system was shown and claimed for transmitting the reciprocating motion of the output link uniformly to the pivot shaft for driving the arm-and-blade subassemblies across the surface of the windshield. One of the advantages of the system disclosed in U.S. Patent 2,901,764 relates to the substantially unmodified transmission of forces from the reciprocating link to the pivot shaft through the intermediary of a cable wrapped around the periphery of a pulleylike member carried by one end of the pivot shaft. Since the pulleylike member is circular in shape the radius from its center to the contacted peripheral surface of the pulleylike member is uniform so that any force transmitted by the link and cable to the pulleylike member is transmitted in a substantially unmodified manner by the pulleylike member to the pivot shaft. Using the system of U.S. Patent 2,901,764 connected with a wiper motor, that portion of the cycle of the wiper motor having greater speed and lower torque characteristics can be indexed through the cable and pulley to the arm-and-blade subassembly at that portion of the windshield where faster wiper speeds are most desirable, i.e. in the line of vision of the driver. Likewise, the lower speed and increased torque portions of the cycle of the motor can be transmitted by the cable and pulley to the arm-and-blade subassemblies at that portion of the wiping cycle where greater torque is desirable, namely, at the opposite extreme positions of the arm and blade on the windshield. This patented structure (2,901,764) is highly desirable and acceptable.

There are to be found on late-model automobiles windshield-wiper apparatus in which the wiper blades do not simultaneously move always in opposite directions, as has been the almost universal practice, but move in the same directions, the primary purpose being to provide overlapping wipe patterns which eliminate some of the unwiped portion of the windshield normally lying at its middle and between the blades when parked with their outer ends adjacent each other. In such instances the blades, if operated in opposite directions, would be required to overlap in the parked position. This introduces the problem of clearing one blade from contact with the other while in operation. To accomplish this there must be an irregular timing of the blades wherein one blade at some point moves faster than the other and out of synchronism with the other.

Where the blades travel in the same direction to provide an overlapped wipe it is necessary to park one of the blades with its outer end lying outward across the sharper curvature of the wrap-around extremity of the windshield. Objections to this have arisen because of the of the difficulty in causing the blade to park full length against the windshield. The outer end of the blade, parked outwardly, projects offensively from the glass—and does not clean the lower portion of the arc of its travel. This condition is aggravated by the fact that usually longer blades are employed to produce this type of overlapped wipe.

For these and other reasons it has become desirable to produce various departures from uniformity in the area wiped by the blades and to produce lack of synchronization in their travel.

Because of the novel adaptability of the instant invention it is practicable to produce up to a wide departure from synchronization of the two blades—and a wide difference in the wipe patern—as well as a difference in the rate of travel of the respective blades with relation to the precise area of the wipe pattern being wiped. All this is achieved without altering the travel or timing of the connection between the motor and the transmission. These results may be achieved by increasing or reducing the diameter of one of the pulleys with relation to the other—or can be achieved by locating the pivot shaft eccentric to the pulley, or by doing both, as to one pulley or another, or as to both pulleys. Another factor that can be employed is to make the pulley generally oval in peripheral outline.

The present invention relates to a motion-transmitting mechanism having an improved structural and functional design for the pulleylike member that is highly adaptable for many varying conditions encountered in the windshield wiper business.

It is an object of this invention to provide an improved motion-transmitting mechanism wherein many advantages of the prior art are preserved without the disadvantages inherent therein.

It is another object of this invention to provide an improved wiping mechanism wherein the respective arm-and-blade subassemblies travel different relative distances during a wiping cycle.

It is still another object of this invention to provide an improved motion-transmitting mechanism wherein the torque transmitted by the pivot shaft of a motor to a driving link member are varied depending on the demands of the system And it is a still further object of this invention to provide an improved wiper mechanism having predetermined synchronized or unsynchronized wiping patterns between the respective arm-and-blade subassemblies.

It is still another object of this invention to provide an improved motion-transmitting device wherein the amount of speed and torque transmitted from a link member to the output pivot shafts can be preset as the anticipated requirements of the system become apparent.

It is a still further object of this invention to provide an improved construction for a pulleylike member.

And a still further object of this invention is to provide an improved link and pulley connection for efficiently transmitting forces from one to the other.

And yet another object of this invention is to provide an improved pulleylike member having a surface with a constantly changing radius throughout adjoining portions of the surface thereof.

And a still further object of this invention is to provide an improved motion-transmitting mechanism that is highly efficient in use, relatively inexpensive to manufacture and install, and relatively trouble-free in operation.

Other objects and advantages of the invention will become apparent after the description hereinafter set forth is considered in conjunction with the drawing annexed hereto.

Figures 1, 2, 3, 4, 5, 6, 7:
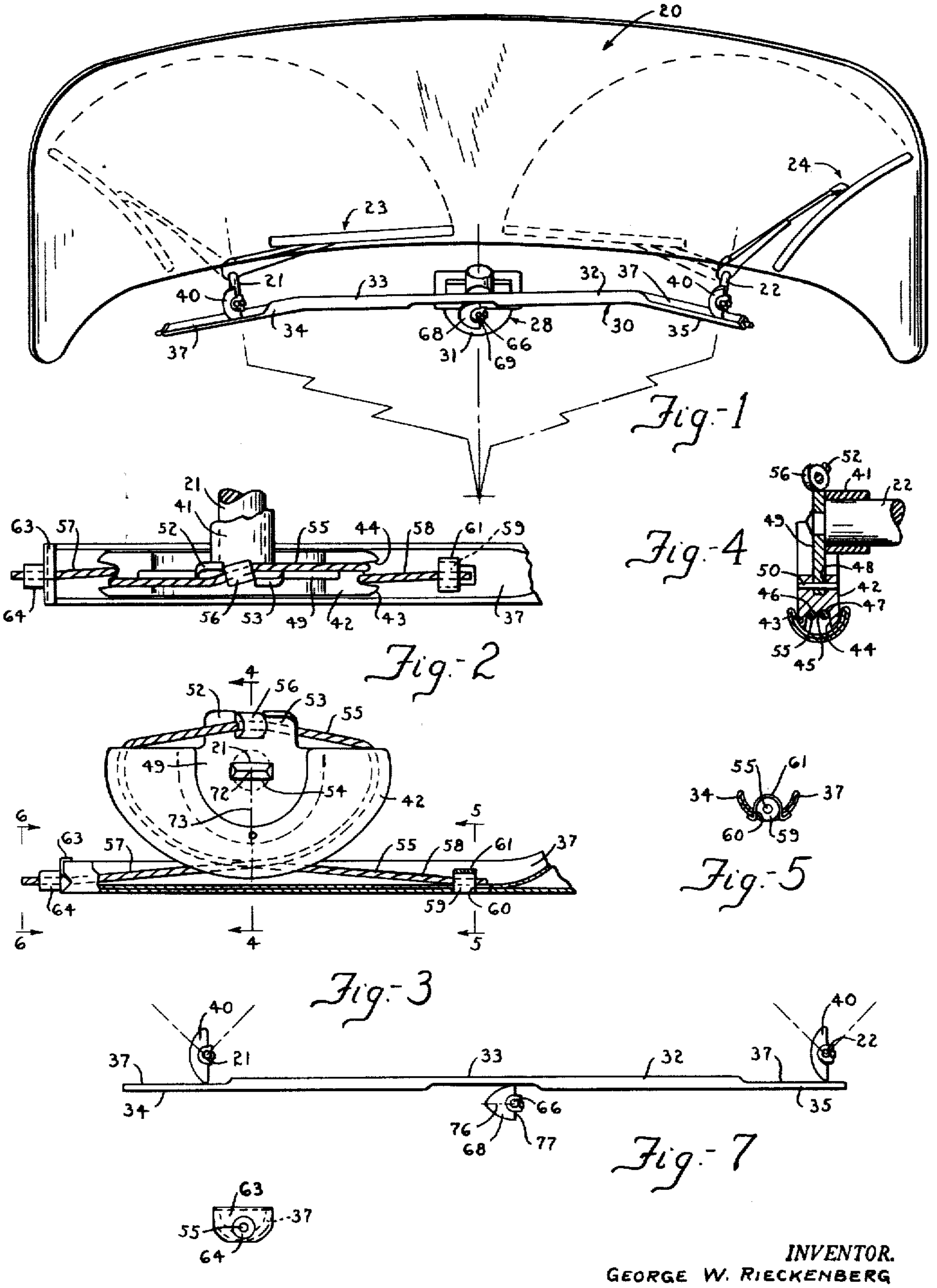
FIGURE 1 is an elevational view of the rear side of a windshield illustrating the apparatus of the invention as applied thereto.
FIGURE 2 is a top plan view of one end of the apparatus of FIGURE 1 showing the connection between a link member and a pivot shaft for a wiper arm-and-blade subassembly.
FIGURE 3 is an elevational view of the structure shown in FIGURE 2 illustrating the operative relationship of the components associated therewith.
FIGURE 4 is a cross-sectional view taken along the lines 4—4 of FIGURE 3.
FIGURE 5 is an end view taken along the lines 5—5 of FIGURE 3.
FIGURE 6 is a cross-sectional view taken along the lines 6—6 of FIGURE 3.
FIGURE 7 is a schematic showing the principal parts of the apparatus of FIGURE 1 for creating oscillatory movement of the wiper arm-and-blade subassembly across a windshield.
Figure 8:
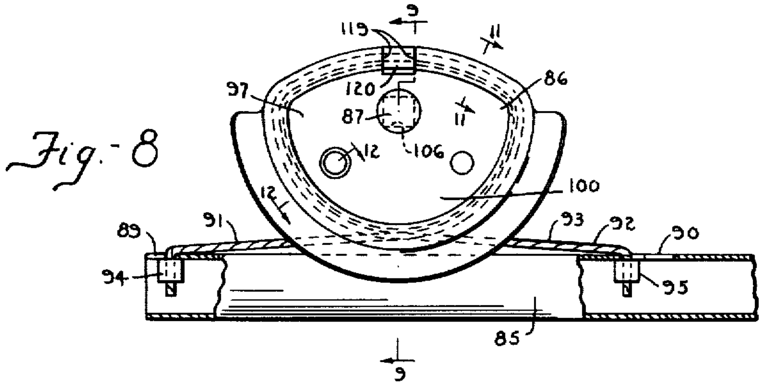
FIGURE 8 is an elevational view of a modified form of pulley member operatively connected with a link member.
Figure 9:
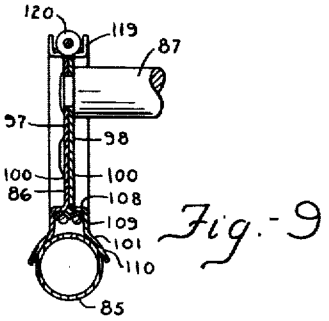
FIGURE 9 is a cross-sectional view taken on the line 9—9 of FIGURE 8.
Figure 11:
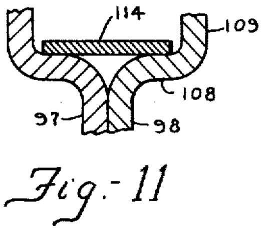
FIGURE 11 is a cross-sectional view taken along the line 11—11 of FIGURE 8.
Figure 10:
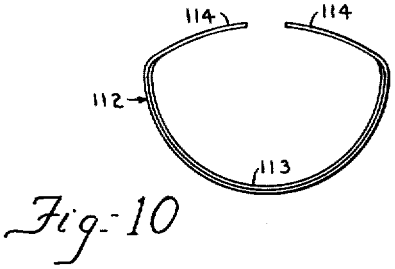
FIGURE 10 is an elevational view of one element of the structure of FIGURE 8.
Figure 12:
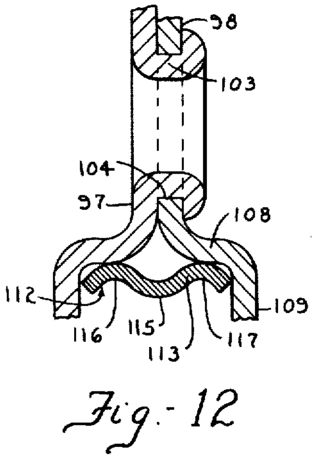
FIGURE 12 is a cross-sectional view taken along the line 12—12 of FIGURE 8.

Referring to the drawings and more particularly to FIGURES 1–7, a windshield 20 is illustrated as having a pair of pivot shafts 21, 22 mounted along the lower edge portion thereof for supporting a pair of windshield wiper arm-and-blade subassemblies 23, 24, respectively, for oscillatory movement across the surface of the windshield. A power unit 28 is operatively connected to the respective shafts 21, 22 through a motion-transmitting unit 30 whereby the oscillatory or rotary motion of the output of the wiper motor 31 is converted to the oscillatory motion of the wiper arm-and-blade subassemblies. The power unit 28 is illustrated as a vacuum motor although it is within the scope of this invention to use an electric motor or an air motor without departing from the spirit of the invention.

The motion-transmitting unit 30 is comprised of an elongate link member 32 having predetermined angular bends or shaping at the ends of the intermediate portion 33 so that the respective end portions 34, 35 are directed in a particular angular relationship with respect thereto. In the illustrated form of FIGURES 1–7, the link member is tubular in cross section and has each end portion 34, 35 rolled into a semicircular elongate section 37. The elongate sections 37 in the end portions 34, 35 face substantially upwardly with respect to the lower portion of the motor vehicle for a purpose to be more clearly described hereinafter.

A pulleylike member 40 which can be die-cast, stamped, or the like is keyed to the inner end portion of each shaft 21 and 22. The shafts 21 and 22 are mounted in sleeve bearings 41 extending through the cowl of the motor vehicle. Each pulleylike member 40 is shown as comprising a formed cam-shaped ring member 42 having a semicircular cross-sectionally shaped peripheral surface 43. Formed in the periphery of the pulleylike member 40 is a groove 44 which has a raised lip or ridge 45 formed in its base wall which divides the bottom of the groove into two parts or channels 46, 47. A slot 48 is formed in an inner face of the ring member 42 in which is keyed a flat disc member 49 by means of a pin 50. A pair of tabs 52, 53 are upset in opposite directions from one end of the disc 49 with a slot or cutout section formed therebetween. A noncircular opening 54 is formed through the disc 49 in which is secured one noncircular-shaped end of the pivot shaft 21 or 22 for keying the pulleylike member 40 to the pivot shaft.

A cable member 55 having a lug 56 clamped near its mid-point has one end 57 fastened near the bottom of the outer end of the section 37 of the link 32 and has its other end 58 fastened near the bottom of the other end of the section 37. The cable is wrapped around the pulley 40 and lies in the parts 46, 47 of the groove 44 with the lug 56 seated between the tabs 52, 53 to prevent slipping between the cable and the pulley. The end 58 of the cable has a lug 59 clamped thereto which is adapted to nest in part in an opening 60 in the base or bottom of the elongate section 37. The lug 59 is held in position in the opening 60 by the body of a U-clamp 61 embracing the lug 59 with the legs of the clamp seating in the opening 60. A shaped cap 63 is adapted to nest over and be secured to the outer end of the section 37 of the link with an aperture formed through the cap in a position near the bottom of the section 37 for permitting the end 57 of the cable 55 to pass therethrough. A lug 64 is clamped to said end 57 of the cable and is adapted to seat against the outer face of the cap to secure said end of the cable and said cap 63 in place on the link 32.

In assembling the cable to the link 32, the lug 59 on the end 58 of the cable and the U-clamp 61 are positioned first in the aperture in the section 37. The other end 57 of the cable is threaded through the aperture in the cap 63 whereupon the lug 64 is clamped in position after the desired degree of tautness is produced in the cable 55.

The depth of the groove 44 in the periphery of the pulley from its base wall to the shaped peripheral surface 43 of the pulley is several times the diameter of the cable 55. As best shown in FIGURE 3, the ends of the cable 55 are positioned near the bottom of the section 37 of the link. The cable extends upwardly from the ends 57, 58 in the bottom part of the section 37 toward each other and toward the pulleylike member 40 where it is seated in the parts or channels 45, 46 of the base of the groove 44. The cable 55 is loaded in tension a predetermined amount initially so that the angular disposition of the cable from its ends to the base of the groove 44 in the pulleylike member 40 creates a force tending to urge the surface 43 of the pulley into nesting relationship with the inner surface of the section 37 of the link 32. As a result of the nesting force the surface 43 of the pulley 40 rolls against the inner surface of the section 37 from one end of the section to the other with substantially the same nesting relationship, no matter whether the link member is positioned below the pulley 40, above the pulley 40, or at any angular position in between.

The coacting guiding fit between the peripheral surface 43 of the pulley 40 and the inner cylindrical surface of the section 37 provides stability between the pulley 40 and the link 32. Under normal conditions, it is to be expected that the direction of motion of the link 32 at the contact point between the pulley and link member is substantially tangential contact directed at right angles to the axis of the shaft. However, due to the flexibility of the system the direction of motion from the link to the pulley can vary several degrees from the perpendicular relationship with respect to the shaft. In addition, either the link 32 can roll several degrees about its substantially longitudinal axis relative to the pulley, or the angle of contact of the pulley with respect to the link 32 can vary several degrees without affecting or interfering with the operation of the device.

The power unit 28 may be any type but, for purposes of illustration, is shown as comprising the oscillating type of vacuum motor 31 which is adapted to oscillate an output shaft 66. The motor 31 is operatively connected with the motion-transmitting unit 30 in such a way as to reciprocably drive the unit 30 during the wiping operation and to move the unit 30 and arm-and-blade subassemblies into parked position when the motor is shut off. A pulleylike member 68 is fastened to the shaft 66 and is adapted to be oscillatably driven by said vacuum motor. A cable 69 is wrapped around the pulley 68 with the ends of the cable fastened to the link member in a manner similar to the connection described with respect to the pulleys 40 on the shafts 21, 22. As the wiper motor 31 is oscillated, the pulley 68 and cable attached to the intermediate portion 33 of the link 32 reciprocates the link and drives the pulleys 40, shafts 21, 22 and arm-and-blade subassemblies 23, 24 in an oscillatory manner. Since the pulleys 40 both engage the link 32 on the same relative side of the link, the arm-and-blade subassemblies are driven in a "tandem" wipe. A tandem wipe is understood to mean a condition wherein the arm-and-blade subassemblies 21 and 22 both move together in the same direction, both to the left and both to the right.

The pulleylike members 40 are fastened to the end of the pivot shafts 21, 22 for oscillatory movement about an axis 72 of each of the shafts, called the pivot axis, which axis lies substantially perpendicular to the plane of the pulleylike members 40. The description will proceed with respect to the pulley 40 and end portion 34 of the link 32, but it is to be understood that the same condition prevails with respect to pulley 40 and end portion 35. As best shown in FIGURE 3, the distance from the pivot axis 72 to the center line of the cable 55 substantially along the geometrical center line 73 of the pulley is the minimum or shortest distance from the axis 72 to the link 32. As the pulleylike member is rolled in either direction along the link member 32 the distance from the pivot axis 72 to the center line of the cable gradually increases until a maximum distance is reached at a point on the pulleylike member substantially 90° from the point constituting the minimum distance. The segment of the peripheral surface of the pulley 40 lying between the shortest distance or radius to the pivot axis and the longest distance or radius to the pivot axis is in substantially rolling contact with the mating inner surface of section 37 of the end portion 34.

With the applied force directed substantially along the axis of the link 32, the shorter radii segments of the pulley create a relatively fast movement of the pivot shaft 21 and the longer radii segments of the pulley create a movement somewhat slower than the shorter radii movements but with a higher torque output to the pivot shaft 21. Applying this principle of shorter and longer radii to the pulley, it is believed to become obvious that any desired speed and torque output condition can be obtained by varying the relative lengths of the radii from the pivot axis to the peripheral surface of the pulleylike member 40.

With the pulleylike member 40 above described carried by the pivot shaft 21, it is apparent that reciprocatory movement of the link member 32 is transmitted to the pivot shaft 21 as oscillatory movement. Due to the relatively short distance from the pivot axis to the cable at the center of the pulleylike member, the wiper arm-and-blade subassembly is moved at the highest relative speed and lowest torque output at this point. The relative speed of the arm-and-blade subassembly is gradually decreased and the torque output is gradually increased as the pulley rolls beyond the central minimum distance point and the distances from the pivot axis to the point of contact between the pulley and link increases. The arm-and-blade subassembly is moving at its slowest rate of speed, but with its highest torque output at the maximum distance from the pivot axis to the contact point between the pulley and link member.

In this manner, the wiper arm and blade is moving relatively fast as it passes the line of sight of the average driver near the center of the wipe pattern and is gradually slowing down in speed but increasing in power as it approaches either end of its wipe pattern. Since the arm and blade moves across the normal field of vision of the driver in rather rapid manner, very little interference to vision is noted. As the blade is slowing down near the extremes of its wipe pattern, the likelihood of slapping and excessive blade layover at the end of the stroke is reduced to a minimum. In addition, the blade has a potentially higher torque output near each end of its stroke which is particularly advantageous in starting the blades from a parked position and in pushing heavy snow and mud accumulations out of the wipe pattern of the blade during use.

The pulley 68 on the pivot shaft 66 of the motor 31 has a different shape from that described with respect to pulleys 40 and, as shown both in FIGURE 1 and FIGURE 7, is operatively connected to the intermediate portion 33 to the link 32 by means of the cable 60. The pulley 68 has its maximum or longest radius 76 at the mid-portion of the operating surface of the pulley and has its minimum or shortest radii 77 at the extremes of the operating surface of the pulley. The output force from the output shaft 66 of the motor 31 is applied to the link 32 through the pulley member 68 such that at the extreme ends of the oscillatory wiper stroke of the motor 31 the short radii 77 is positioned between the shaft 66 and the contacted intermediate portion 33 of the link 32. As the motor 31 reaches the mid-position of its stroke, the long radius 76 will be positioned between the shaft 66 and the portion 33 of the link 32. Due to the characteristics of the device, the short radii 77 will produce the highest torque and the lowest speeds as transmitted from the shaft 66 to the link 32. The longest radius 76 of the pulley 68 will produce the lowest torque and the highest speed as transmitted to the link 32. With the puley 68 positioned with the short radii 77 between the shaft 68 and the link 32 and with the pulleys 40 having the long radii between the pivot shafts 21 and 22 and the end portions of the link 32, it is believed to be obvious that the desirable characteristics are compounded with the result that relatively high torque and relatively low speeds are transmitted to the arm-and-blade subassemblies at the inboard and outboard ends of the stroke of said subassemblies 23 and 24. As the motor rotates the shaft 66 through ninety degrees of rotation, the longest radius 76 on the pulleylike member 68 and the shortest radius 73 on the pulleylike member 40 are transmitting and receiving forces respectively from the motor and compounding the higher speeds and lower torque characteristics of their respective drives, such that as the wiper subassemblies 23 and 24 pass the line of vision of the driver the relatively high speed of movement is transmitted thereto by the pulley assemblies.

Figure 13:
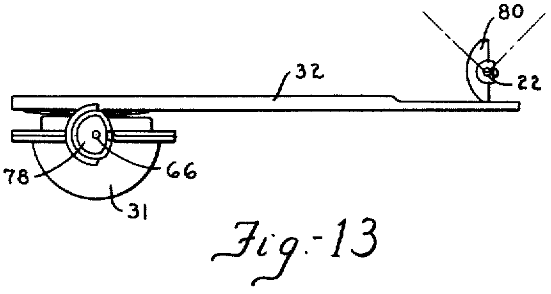
FIGURE 13 is a schematic showing of a modified form of assembly employing my invention.

It is believed to be obvious that a circular-type pulley 78, or any other means for reciprocating the links, could be used on the motor shaft 66 with a slightly reduced but still highly desirable effect being transmitted to the subassemblies 23 and 24. This is best illustrated in FIGURE 13 wherein a circular pulley 78 of the type to be described with respect to FIGURES 8–12 is provided on the motor 31 for transmitting the usual reciprocating output forces of the motor to the link 32 without modification by the pulley. However, the pulleylike member 80 on the shaft 22 is of varying radii of curvatures as discussed above with respect to the pulley members 40 so as to transmit the desirable characteristics of low speed and high torque to the subassemblies at the outboard and inboard ends of the stroke of the wiper subassemblies and relatively high speed and low torque in the line of vision of the occupants of the vehicle.

By mounting one pivot shaft 21 above the one end portion of link 32 and the other pivot shaft 22 below the other end portion of link 32, the resulting motion of the arm-and-blade subassemblies 23 and 24 is from both blades positioned outboard on the windshield and moving together toward the inboard position of the windshield, and upon reversal moving together in opposite directions toward the outboard position again. The desirable results produced by the cam-shaped pulley members can be used with equal advantage in this system of wiping as well as in the "tandem" wipe system.

FIGURES 8–12 show further modifications of my invention wherein a reciprocably driven link member 85 is shown operatively connected to a pulleylike member 86 for oscillatably driving a pivot shaft 87 about its longitudinal axis. The link member 85 is tubular in cross section and is provided with a pair of longitudinally spaced-apart apertures 89 and 90. Crimped on the opposite end portions 91, 92 of a cable 93 are the lugs 94, 95 which are seated in the tubular link beneath the walls defining the apertures 89, 90. The pulleylike member 86 is only partially circular in shape with that portion of the periphery of the pulley member 86 that is not intended to operatively contact the tubular member 85 cut away to save material and weight, as well as installation space as will appear hereinafter.

The pulleylike member 86 is shown as comprised of a pair of equal and opposite halves 97, 98, each half having a body portion 100 and a shaped flange portion 101 integrally formed therewith about the periphery thereof. The body portions 100 are fastened together in a face-to-face relationship by means of coacting lugs 103 and mating apertures 104 on each body portion 100, which lugs 103 can be peened over to hold the pulley member assembled. A shaped aperture 106 is formed through the center of the circular part of the pulley member such that the distances from the center of the aperture 106 to the rim of the pulley member are equal from the left-hand extreme of the pulley member to the right-hand extreme as viewed in FIGURE 8.

The flange portion 101 of the pulley member 86 is shaped with a bottom wall 108 formed outwardly at substantially a right angle to the body portion. A side wall 109 is integrally formed with the bottom wall at a right angle thereto and an arcuately curved contact wall 110 is integrally formed in angularly flared relationship outwardly with respect to said side wall 109. A rim member 112 has a central part 113 seated on the bottom walls 108 and a pair of end parts 114 curved inwardly toward each other so as to conform to the peripheral shape of the pulley member. The central part 113 of the rim member has a longitudinally disposed ridge 115 formed in the center thereof to divide the part 113 into two spaced-apart grooves 116, 117. The bottom walls 108 and side walls 109 extend almost completely around the periphery of the pulley member 86 while the flared contact walls 110 only extend around the circular or contacting operative portion of the pulley member. The only break in the bottom walls 108 and side walls 109 of the pulley member 86 is in the mid-part of the noncircular part where a pair of spaced abutments 119 are formed for receiving in abutting relationship a lug 120 fastened to the mid-portion of the cable 93 for limiting longitudinal slip of the cable relative to the pulley member 86.

The cable 93 has the end portion 91 secured to the link 85 and extends into contacting relation with the base of the groove 116. The cable continues around the pulley member through the lug 120 into operative contact with the base of the groove 117 and is secured to the link 85 at its other end portion 92. The cable 93 is loaded under tension for urging the inner-shaped faces of the arcuately flared contact wall 110 into operative position with respect to the tubular link 85. As the link is longitudinally reciprocated, the cables drivingly oscillate the pulley member 86 about the axis of the shaft 121. The shape of the flared contact wall 110 is such with respect to the surface of the link 85 that a limited angular deviation from the ideal transverse relationship between the shaft 121 and the link 85 is permitted without any binding between the members or loss of efficiency of the system.

It is believed to be obvious that the pulleylike member 86 of FIGURES 8–12 which engages the outside of the link 85 could have changing radii of curvature from short at the center to long at both sides, similar to the type shown in FIGURES 1–7, without departing from the spirit of my invention. It is likewise intended that the constant-radius, partial-pulleylike structure of FIGURES 8–12 could be used with a cast-type structure, as shown in FIGURES 1–7, without departing from my invention.

The partially shaped pulley member is especially desirable in that it saves material, weight and cost. In addition, it is easier to install a partial pulley and link assembly in the limited space provided in most present-day motor vehicles. The pulleylike member can be made to engage with either the exterior surface or the interior surface of a link member and can be made of a casting or a stamping in either a symmetrical or unsymmetrical form, all within the objects of the invention.

Figure 14:
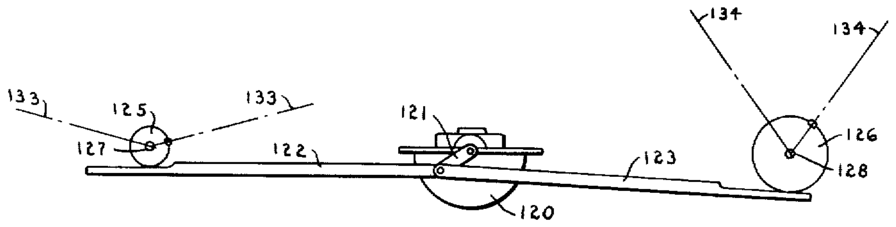
FIGURE 14 is a schematic showing of a modified form of my invention.

FIGURE 14 shows a wiper system having a wiper motor 120 connected by a crank 121 to the reciprocating links 122, 123 which in turn are connected by flexible means (not shown) to the pulleylike members 125, 126 carried by the ends of the respective pivot shafts 127, 128. A pair of arm-and-blade subassemblies (not shown) are operatively connected to the pivot shafts 127, 128 for movement across the surface of the windshield. The pulleylike members 125, 126 are of different size, the radius of member 125 being smaller than the radius of member 126. Since the stroke of the links 122, 123 to the tangential surface of the members 125, 126 is the same, and since the effective lever arm from the surface of the members 125, 126 to the center of the pivot shafts 127, 128 is different, the movements of the shafts and arm-and-blade subassemblies will vary according to a predetermined pattern. The arm-and-blade subassembly connected to the shaft 127 and driven through pulleylike member 125 has a relatively wide wipe pattern, the limits of which are designated by the dotted lines 133. The arm-and-blade subassembly connected to the shaft 128 and driven by the motor through member 126 has a relatively narrow wipe pattern, the limits of which are designated by the dotted lines 134.

The links 122, 123 are connected to the same relative side of the pulleylike members 125, 126 such that activation of the motor 120 drives the subassemblies in a tandem wipe pattern. Each subassembly completes its end-to-end cycle in the same time, such that the subassembly connected to the pulley member 125 is—at any one time in the cycle—moving at a relatively greater rate of travel then the subassembly connected to the pulley member 126. Thus the subassembly on member 125 is covering its wider wipe pattern in the same time as the subassembly on member 126 is covering its smaller wipe pattern.

Figure 15:
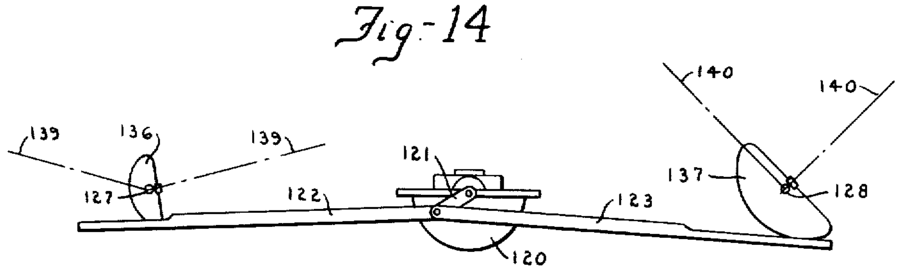
FIGURE 15 is a schematic showing of a modified form of my invention.

FIGURE 15 illustrates the same motor 120, crank 121, links 122, 123 and shafts 127, 128 for driving the pair of arm-and-blade subassemblies. A pair of cam-shaped pulleylike members 136, 137 of the general type shown and described with respect to FIGURES 1–4 are mounted on the respective shafts 127, 128 and are operatively connected to the links 122, 123 by means of flexible cables as generally shown and described with respect to FIGURES 1–4. The pulleylike members 136, 137 are of different sizes but are of the same general shape, which shape is in the form of half of an ellipse or the like. The smaller pulleylike member 136 is adapted, when drivingly connected to the motor 120, to move the arm-and-blade subassembly connected to the shaft 127 between the relatively wide limits 139 designated by dotted lines. The larger pulleylike member 137 is adapted, when drivingly connected to the motor 120, to move the arm-and-blade subassembly connected to the shaft 128 between the relatively narrow limits 140 designated by dotted lines.

The respective arm-and-blade subassemblies move between their limits 139, 140 in the same time increment and receive the high-speed low-torque center condition and low-speed high-torque end conditions inherent in the cam-shaped type pulleylike structure, as set out above with respect to FIGURES 1–4.

By using the different sized pulleylike members, the relative size of the wipe pattern is varied depending on the results desired.

Figure 16:
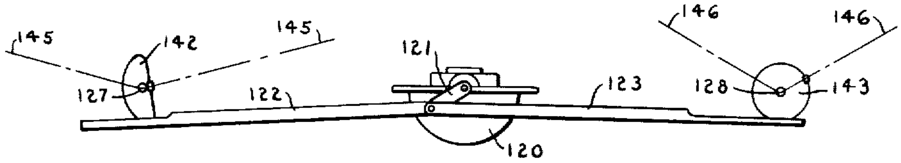
FIGURE 16 is a schematic showing of a modified form of my invention.

FIGURE 16 shows the motor 120 connected by crank 121 with the links 122, 123 which are drivingly connected with the pulleylike members 142, 143. The members 142, 143 are connected with the pivot shafts 127, 128 for driving the respective arm-and-blade subassemblies. Pulleylike member 142 is of the cam-shaped type and pulleylike member 143 is of the fixed-radius or circular type. The pulleylike member 142 drives its associated arm-and-blade subassembly with relatively high speed and low torque at the central portion of its stroke and with relatively low speed and high torque at the end portions of its stroke. The arm-and-blade subassembly carried by the shaft 127 moves between the limits 145 shown by dotted lines.

The pulleylike member 143 drives the associated arm-and-blade subassembly with the force pattern transmitted to the pulley member 143 by the motor 120 and link 123. The subassembly moves between the limits 146 shown by the dotted lines. The respective subassemblies are moved between their respective limits 145, 146 in the same period of time with the subassembly associated with pulley member 142 receiving the high-speed low-torque, low-speed high-torque characteristics of said pulley 142 and with the subassembly associated with pulley member 143 receiving the substantially unaltered characteristics of the output of the motor 120.

Figure 17:
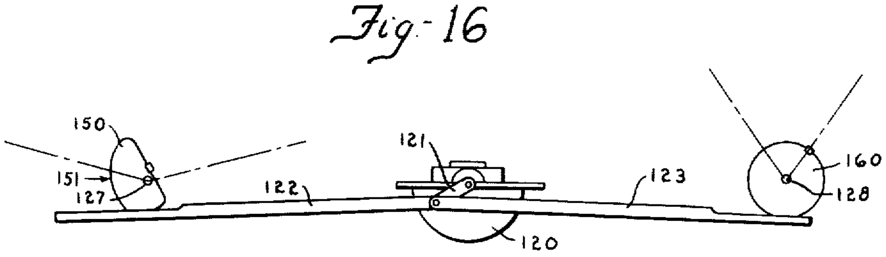
FIGURE 17 is a schematic showing of a modified form of my invention.
Figure 18:
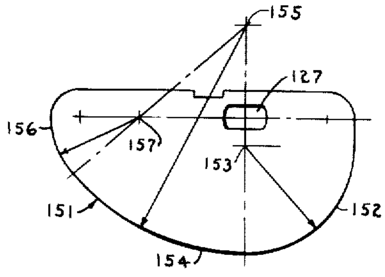
FIGURE 18 is an enlarged view of one of the pulleylike members.

FIGURE 17 shows structure similar to the structure of FIGURE 16 except that one pulleylike member 150 has an unsymmetrically shaped surface 151, as is better illustrated in detail in FIGURE 18. Part 153 of the surface 151 of the pulley 150 is generated about a center 153, another part 154 about a center 155 and another part 156 about a center 157. Each part 152, 154 and 156, when operatively disposed between the link 122 and shaft 127, produces different characteristic movements in the arm-and-blade subassembly driven by said shaft 127.

The pulleylike member 160 has a constant radius and transmits the characteristics of the output of the motor 120 substantially unchanged to the shaft 128 and the arm-and-blade subassembly.

The size of the radius of the pulleylike members can be varied within wide practical ranges as can the shapes of the contacting surfaces of the various pulleylike members. Various combinations of small and large pulleylike members, constant radius pulleylike members, eccentrically shaped pulleylike members and/or odd-shaped pulleylike members are considered to be within the scope of this invention.

Having thus described my invention, it is obvious that various modifications may be made in the same without departing from the spirit of the invention; and, therefore, I do not wish to be understood as limiting myself to the exact forms, constructions, arrangements and combinations of parts herein shown and described.

I claim:

1. A motion-transmitting mechanism for transmitting motion from a power unit to a windshield wiper arm comprising in combination: a driven shaft adapted to receive an arm, an eccentrically shaped pulleylike member connected with said driven shaft for oscillatory movement about the axis of the shaft, said pulleylike member having a peripheral portion concavely shaped in cross section in a plane containing the axis of the shaft, cylindrically shaped link means adapted to be connected with said power unit and operatively engaging with said concavely shaped peripheral portion of the pulleylike member, flexible means substantially surrounding the periphery of said pulleylike member and being attached at spaced points to said link means, whereby said link means seats in the shaped portion of the pulleylike member for guiding said link means and said pulleylike member relative to each other.

2. A motion-transmitting mechanism for transmitting motion from a power unit to a wiper-carrying arm comprising in combination: a pivot shaft adapted to receive a wiper-carrying arm, a link means adapted to be operatively connected with said power unit in a manner whereby reciprocatory movement is imparted to said link means, oscillatable means connected with said pivot shaft, flexible means substantially surrounding said oscillatable means and having end portions attached to said link means, said oscillatable means comprising a pulleylike member, axially spaced-apart annular grooves formed around the periphery of the pulley, said flexible means engaging in said grooves formed about the peripheral surface of said pulleylike member, the distances from the axis of the pulley to the base of said groove varying from a maximum to a minimum throughout a predetermined segment of said pulleylike member whereby the minimum distances are adapted to create higher angular speeds of the wiper-carrying arm over the surface of the windshield and said maximum distances are adapted to create lower angular speeds and higher torque output over a different portion of the windshield surface.

3. A motion-transmitting mechanism for transmitting motion from a power unit to a wiper-carrying arm comprising in combination: a pivot shaft adapted to receive a wiper-carrying arm, link means adapted to be operatively connected with said power unit in a manner whereby reciprocatory movement is imparted to said link means, pulley means connected with said pivot shaft, flexible means substantially surrounding said pulley means and having end portions attached to said link means, axially spaced-apart annular grooves formed around the periphery of the pulley, said flexible means engaging in each groove formed about the peripheral surface of said pulley means, the distances from the axis of the pulley means to the base of said groove varying from a maximum to a minimum throughout a predetermined segment of said pulley means, said minimum distance creating a higher speed of the wiper-carrying arm over the surface of the windshield, said maximum distance creating a lower speed and higher torque output over a different portion of the surface of the windshield.

4. A motion-transmitting device for transmitting motion from a power unit to a wiper-carrying arm comprising in combination: a driven shaft adapted to receive a wiper-carrying arm, a pulley secured to said driven shaft and having a concavely shaped peripheral portion, actuating means having a tubularly shaped contacting portion and a driven portion for connection to a power unit, said contacting portion of said actuating means operatively receiving the peripheral portion of said pulley, flexible means substantially surrounding the pulley and having ends attached respectively to spaced points on said actuating means whereby reciprocation of said actuating means oscillates said pulley and said shaft, said pulley having the distance from the axis of the shaft to the operative surface of the pulley gradually varying from a maximum to a minimum and back to a maximum, said maximum distances converting the motion of the actuating means to relatively high torque and low speed operation of the wiper-carrying arm, and the minimum distance converting the motion of the actuating means to the relatively low torque and high speed operation of the wiper-carrying arm.

5. A motion-transmitting mechanism for transmitting motion from a power unit to a wiper-carrying arm comprising in combination: a driven shaft adapted to receive an arm, an eccentrically shaped pulleylike member connected with said driven shaft for oscillatory movement about the axis of the shaft, said pulleylike member having a peripheral portion concavely shaped in cross section in a plane containing the axis of the shaft and having an outer portion thereof arcuately shaped adapted to receive in spaced relation with respect to the other part of the concavely shaped cross section cylindrically shaped link means providing a connection between said power unit and said pulleylike member, flexible means substantially surrounding the periphery of said pulleylike member and being attached at spaced points to said link means whereby said link means seats adjacent the arcuately shaped outer portion of the pulleylike member for guiding said link means and said pulleylike member relative to each other.

References Cited in the file of this patent

UNITED STATES PATENTS

| | | |
|---|---|---|
| 2,521,893 | Kyle | Sept. 12, 1950 |
| 2,691,186 | Oishei et al. | Oct. 12, 1954 |
| 2,901,764 | Anderson | Sept. 1, 1959 |

FOREIGN PATENTS

| | | |
|---|---|---|
| 213,926 | Australia | Mar. 25, 1958 |
| 678,333 | France | Dec. 23, 1929 |

UNITED STATES PATENT OFFICE

CERTIFICATE OF CORRECTION

April 30, 1963

Patent No. 3,087,344

George W. Rieckenberg

It is hereby certified that error appears in the above numbered patent requiring correction and that the said Letters Patent should read as corrected below.

Column 10, line 25, before "link" strike out "a"; column 12, line 12, for "2,521,893" read -- 2,521,983 --.

Signed and sealed this 21st day of July 1964.

(SEAL)

Attest:

ESTON G. JOHNSON
Attesting Officer

EDWARD J. BRENNER
Commissioner of Patents